April 25, 1939.  T. GYURE  2,156,178
MOTOR VEHICLE BRAKE
Filed May 13, 1938  2 Sheets-Sheet 1
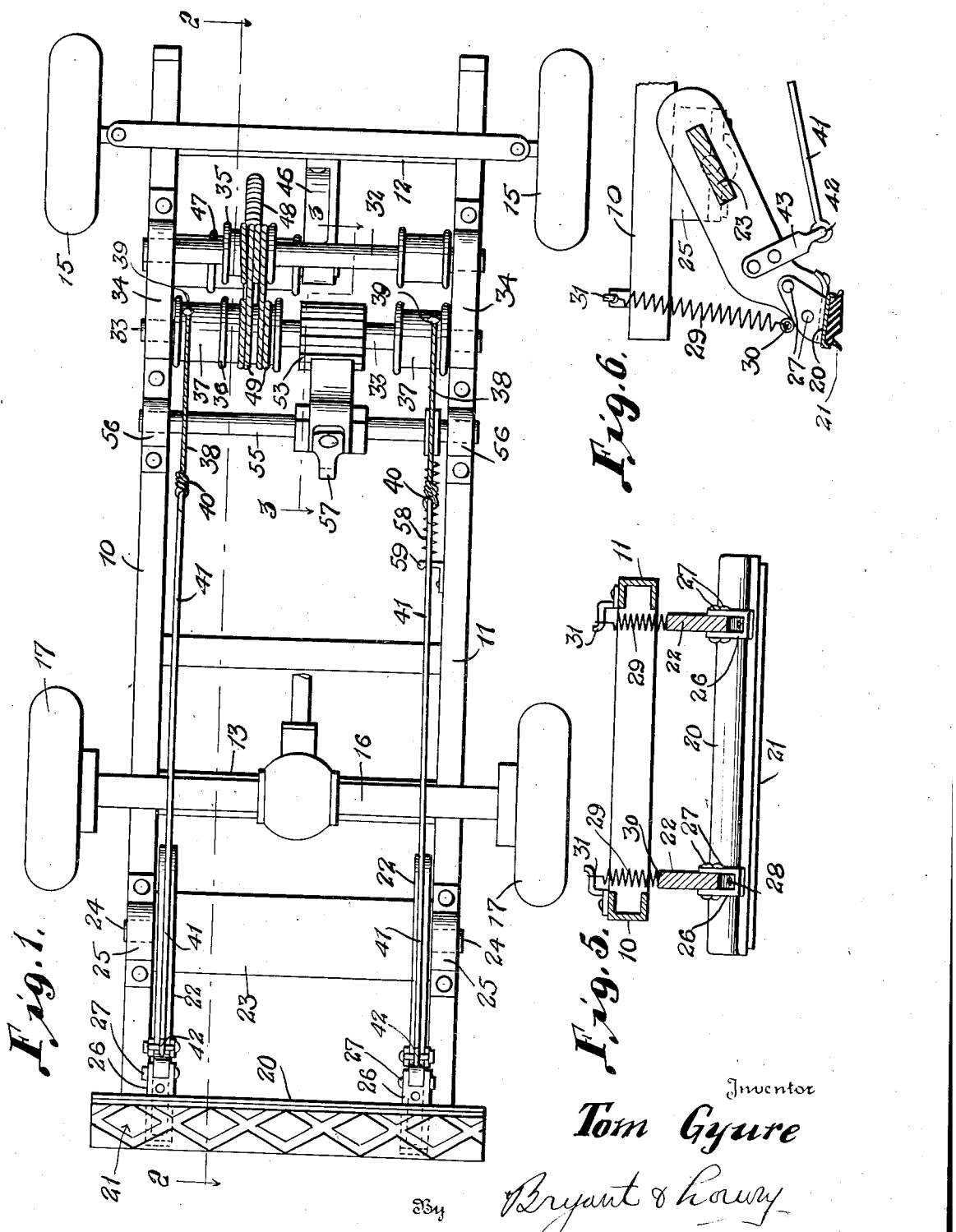

April 25, 1939.  T. GYURE  2,156,178
MOTOR VEHICLE BRAKE
Filed May 13, 1938   2 Sheets-Sheet 2
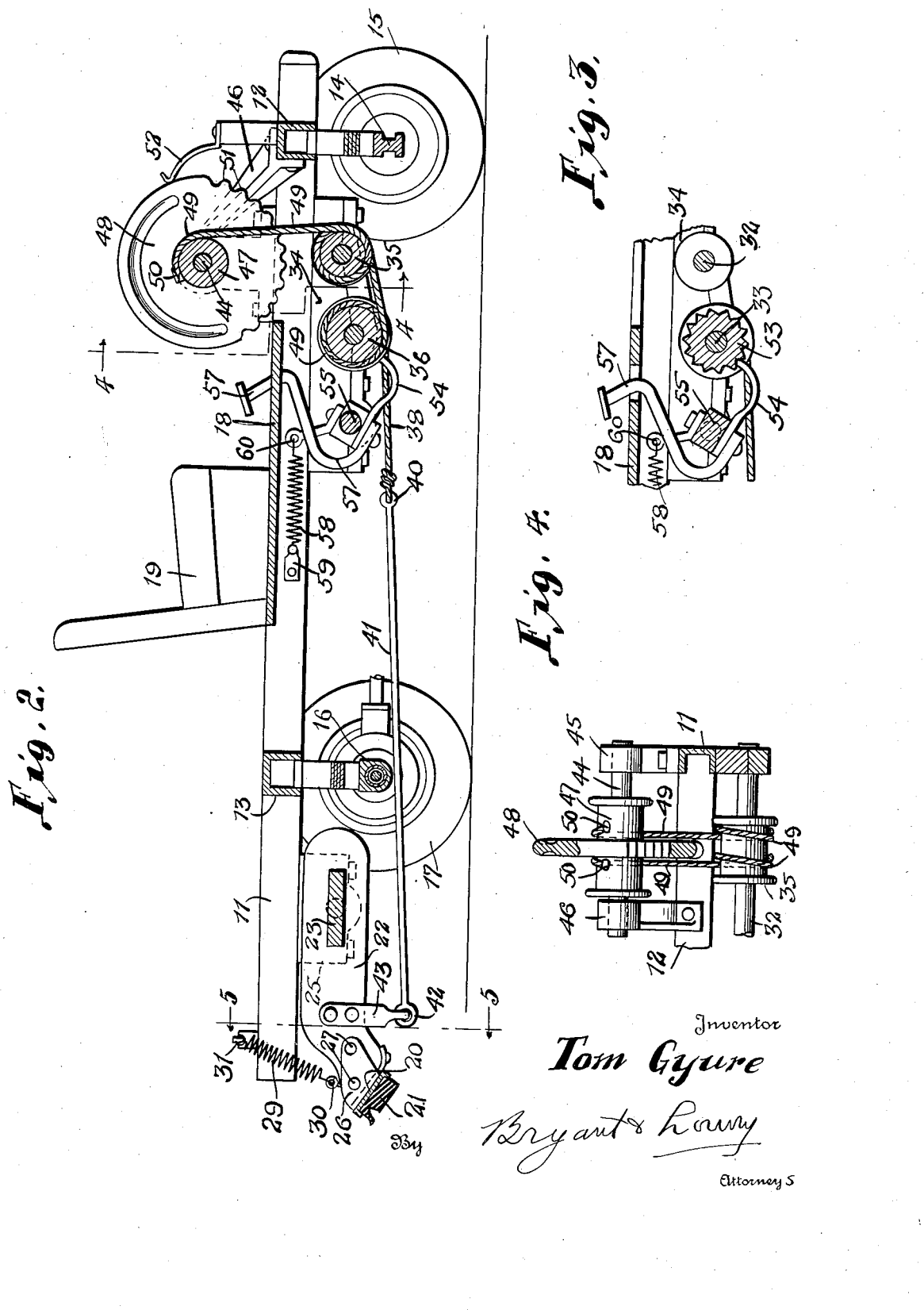
Inventor
Tom Gyure
By Bryant & Lowry
Attorneys Patented Apr. 25, 1939

2,156,178

UNITED STATES PATENT OFFICE 2,156,178

MOTOR VEHICLE BRAKE

Tom Gyure, Bakersfield, Calif.

Application May 13, 1938, Serial No. 207,815

5 Claims. (Cl. 188—5)

This invention relates to certain new and useful improvements in motor vehicle brakes.

The primary object of the invention is to provide braking mechanism for motor vehicles, especially of the emergency or parking type, wherein a brake bar extending transversely of the rear end of the motor vehicle and normally held in an inoperative elevated position is adapted to be lowered for ground engagement at the extreme rear end of the motor vehicle for arresting movement of the same.

A further object of the invention is to provide motor vehicle braking mechanism of the foregoing character that is comparatively simple in construction and operation and one that is capable of attachment to motor vehicles of standard construction.

With the above and other objects in view that will become apparent as the nature of the invention is better understood, the same consists in the novel form, combination and arrangement of parts hereinafter more fully described, shown in the accompanying drawings and claimed.

In the drawings:

Figure 1 is a bottom plan view of a motor vehicle chassis equipped with the improved emergency and parking brake mechanism;

Figure 2 is a longitudinal sectional view taken on line 2—2 of Figure 1, showing the rearwardly positioned transversely extending ground engaging brake bar in its elevated inoperative position and the forwardly positioned operating mechanism therefor;

Figure 3 is a fragmentary longitudinal sectional view taken on line 3—3 of Figure 1, showing the pawl and ratchet mechanism for holding the brake shoe bar in its lowered operative position and manually operable for the automatic release of the brake shoe bar;

Figure 4 is a fragmentary cross-sectional view taken on line 4—4 of Figure 2, showing the hand wheel and a part of the pull cord mechanism for the manual operation of the brake shoe bar;

Figure 5 is a cross-sectional view taken on line 5—5 of Figure 2, showing the spring devices for normally holding the brake shoe bar in its elevated inoperative position; and Figure 6 is a fragmentary longitudinal sectional view showing the brake shoe bar lowered to its ground engaging operative position against the tension of the retracting springs therefor.

The brake mechanism is associated with a motor vehicle that includes the chassis having side bars 10 and 11 connected by cross-bars 12 and 13 respectively adjacent the front and rear ends thereof, a front axle 14 carrying ground wheels 15 being supported by the chassis beneath the cross-bar 12, while a rear axle housing 16 carrying ground wheels 17 is supported on the chassis beneath the rearwardly positioned cross-bar 13. A floor board 18 is carried by the motor vehicle chassis and upon which the operator's seat 19 is mounted.

A ground engaging brake shoe is carried by the rear end of the motor vehicle and is supported on the side chassis bars 10 and 11, the brake shoe comprising a transversely extending bar 20 carrying on its lower side a grooved or anti-skid surfaced rubber strip 21. It is to be understood, however, that a metallic strip or sprag may be substituted for the anti-skid rubber strip 21. A pair of side bars 22 connected by a transversely extending reinforcing board 23 are respectively disposed adjacent the inner sides of the opposite chassis bars 10 and 11 and each side bar 22 carries an outwardly directed pin 24 journalled in a bearing 25 secured to the underside of the chassis bars. The forward ends of the side bars 22 are pivotally supported on the chassis bars 10 and 11 and the rear ends of said side bars are connected to the cross-bar 20 of the brake shoe by means of U-shaped clips 26 straddling the rear ends of the side bars 22 and anchored thereto at spaced points as at 27 with the bights of the clips 26 anchored as at 28 to the upper sides of the cross bar 20 of the brake shoe. The ground engaging brake shoe is normally held in its inoperative elevated position as shown in Figure 2 by means of a pair of retractile coil springs 29, each of which is associated with a side bar 22 by having one end thereof attached as at 30 to the rear end of the side bar while the other or upper end of the spring 29 is attached to the hook member 31 carried by the rear end of the adjacent side bar of the motor vehicle chassis.

The operating mechanism for the brake shoe is carried by the forward end of the motor vehicle chassis beneath the floor board 18 thereof and forwardly of the operator's seat 19 and includes a pair of transversely extending parallel shafts 32 and 33 journalled at their opposite ends in bearings 34 depending from the side chassis bars 10 and 11, each of said shafts having pulleys 35 and 36 respectively anchored thereto for the tracking of cables to be presently described. A pulley 37 is fixed to each end of the shaft 33 inwardly of the chassis bars 10 and 11 and each pulley has one end of a cable 38 anchored thereto as at 39, the other end of the cable 38 being attached as at 40 to the forward end of a pull rod 41, the rear end of which pull rod has an eye or link connection 42 with a bracket arm 43 carried by the adjacent side bar 22 of the brake shoe device.

At the upper and forward end of the motor vehicle chassis as shown in Figures 2 and 4, a shaft 44 journalled at its ends in brackets 45 and 46 supported by and respectively rising from the side chassis bar 11 and the cross-bar 12 with a pulley 47 anchored to the shaft 44 between said bearings, the pulley 44 being located above the pulley 35 carried by the lower shaft 32. A hand wheel 48 in the form of a disk is arranged intermediate the ends of the pulley 47 and centered thereon to constitute manually operated means for the shaft 44 and said pulley 47 at each side of the hand wheel 48 has corresponding ends of a pair of cables 49 anchored thereto as at 50, the cables 49 being first trained over the pulley 35 on the shaft 32 and then trained over the pulley 36 on the shaft 33 with the other ends of said cables 49 anchored to said pulley 36. A portion of the peripheral edge of the hand wheel 48 is notched or serrated as at 51 that is engaged by the end of the leaf spring 52 supported on the forward end of the motor vehicle chassis for holding the hand wheel against vibratory or accidental rotative movements when the ground engaging brake shoe is lowered to its operative position.

To lower the brake shoe against the tension of the springs 29, the hand wheel 48 is rotated by the operator and the winding of the cables 49 on the pulley 47 effects rotation of the shafts 32 and 33 by the cable connections therebetween together with the winding of the cables 38 upon the pulleys 37 upon the shaft 33 and a pull on the rods 41, the brake shoe being then lowered to its ground engaging operative position as shown in Figure 6.

To hold the brake shoe in its operative position, a ratchet wheel 53 carried by the shaft 33 intermediate the ends thereof and is engaged by a pawl 54 carried by a transversely extending rod 55 that is journalled at its ends in bearings 56. A curved pedal arm 57 is attached at its lower end to the shaft 55 and rises upwardly through an opening in the floor board 18 for the manual rotation of the shaft 55 and release of the pawl 54 from the ratchet wheel 53. To retain the pawl 54 engaged with the ratchet wheel 53, the shaft 55 is tensioned by the spring 58 that is anchored at one end as at 59 to the side chassis bar 11 of the vehicle while the forward end of the spring 58 is attached to an arm 60 projecting laterally of the shaft 55.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:

1. In a motor vehicle brake of the character described, a motor vehicle chassis having side bars, a pivotally mounted ground engaging brake shoe extending transversely of the rear end of the chassis bars, means for normally holding the brake shoe in an elevated inoperative position, and manually operable means at the forward end of the chassis for operating the brake shoe including a pair of shafts having cables wound thereon, a manually operable hand wheel for exerting a pull on the cables and a rod connection between the brake shoe and one of said shafts.

2. In a motor vehicle brake of the character described, a motor vehicle chassis having side bars, a pivotally mounted ground engaging brake shoe extending transversely of the rear end of the chassis bars, means for normally holding the brake shoe in an elevated inoperative position, and manually operable means at the forward end of the chassis for operating the brake shoe including a pair of shafts having cables wound thereon, a manually operable hand wheel for exerting a pull on the cables and a rod connection between the brake shoe and one of said shafts, the brake shoe comprising a transversely extending bar, a pair of side bars pivoted at corresponding ends to the chassis bars and rigidly connected at their other ends to the brake shoe bar.

3. In a motor vehicle brake of the character described, a motor vehicle chassis having side bars, a pivotally mounted ground engaging brake shoe extending transversely of the rear end of the chassis bars, means for normally holding the brake shoe in an elevated inoperative position, and manually operable means at the forward end of the chassis for operating the brake shoe including a pair of shafts having cables wound thereon, a manually operable hand wheel for exerting a pull on the cables and a rod connection between the brake shoe and one of said shafts, said pair of shafts extending transversely of the chassis at the under side thereof, a pulley on each shaft, the cables being attached at one end to one pulley and wound on both pulleys with the other ends of the cables attached to the hand wheel and means associated with one shaft for holding the same against movement when the brake shoe is lowered into ground engaging operative position.

4. In a motor vehicle brake of the character described, a motor vehicle chassis having side bars, a pivotally mounted ground engaging brake shoe extending transversely of the rear end of the chassis bars, means for normally holding the brake shoe in an elevated inoperative position, and manually operable means at the forward end of the chassis for operating the brake shoe including a pair of shafts having cables wound thereon, a manually operable hand wheel for exerting a pull on the cables and a rod connection between the brake shoe and one of said shafts, said pair of shafts extending transversely of the chassis at the under side thereof, a pulley on each shaft, the cables being attached at one end to one pulley and wound on both pulleys with the other ends of the cables attached to the hand wheel and means associated with one shaft for holding the same against movement when the brake shoe is lowered into ground engaging operative position, including a ratchet wheel on one of said shafts, and a manually operable tensioned pawl engageable with the ratchet wheel.

5. In a motor vehicle brake of the character described, a motor vehicle chassis having side bars, a pivotally mounted ground engaging brake shoe extending transversely of the rear end of the chassis bars, means for normally holding the brake shoe in an elevated inoperative position, and manually operable means at the forward end of the chassis for operating the brake shoe including a pair of shafts having cables wound thereon, a manually operable hand wheel for exerting a pull on the cables and a rod connection between the brake shoe and one of said shafts, said pair of shafts extending transversely of the chassis at the under side thereof, a pulley on each shaft, the cables being attached at one end to one pulley and wound on both pulleys with the other ends of the cables attached to the hand wheel and means associated with one shaft for holding the same against movement when the brake shoe is lowered into ground engaging operative position, including a ratchet wheel on one of said shafts, a shaft journalled transversely of the chassis and rotatably tensioned in one direction, a pawl carried by the tensioned shaft and engaged with the ratchet wheel and a pedal carried by the shaft for manual operation thereof.

TOM GYURE.